INSTRUMENT HOUSING

Filed May 13, 1968 2 Sheets-Sheet 1

INVENTORS
L. DENNIS SHAPIRO
PAUL E. BREFKA
PETER A. LATHAM
PAUL J. LaBRIE
BY Joseph Weingarten
Stanley M. Schwarz
ATTORNEYS Nov. 18, 1969 L. D. SHAPIRO ET AL 3,479,568

INSTRUMENT HOUSING

Filed May 13, 1968 2 Sheets-Sheet 2

INVENTORS
L. DENNIS SHAPIRO
PAUL E. BREFKA
PETER A. LATHAM
PAUL J. LaBRIE

BY Joseph Weingarten
Stanley M. Schurgin
ATTORNEYS

United States Patent Office 3,479,568
Patented Nov. 18, 1969

3,479,568

INSTRUMENT HOUSING

Laban D. Shapiro, Lincoln, Peter A. Latham, Concord, Paul E. Brefka, Framingham, and Paul J. La Brie, Woburn, Mass., assignors, by direct and mesne assignments, to Aerospace Research, Inc., Boston, Mass., a corporation of Massachusetts Filed May 13, 1968, Ser. No. 728,713
Int. Cl. H02b *1/08, 9/00, 1/04*
U.S. Cl. 317—120 12 Claims

ABSTRACT OF THE DISCLOSURE

A housing is especially suited for electronic circuitry and formed of first and second extruded unitary members. Fittings for the mounting of circuitry and for interlocking the two members are formed integrally with these members, and the assembled housing is extremely rugged and yet attractive in appearance.

FIELD OF THE INVENTION

This invention relates to the packaging of electronic and electrical circuitry and more particularly to unitary housings for such circuitry.

BACKGROUND OF THE INVENTION

Electronic and electrical circuitry is usually mounted on a chassis which is attached to a front panel containing necessary control knobs and indicators, and a back panel containing power receptacles, fuses and the like, this assembly being housed within a cabinet. Conventionally, the hardware fittings required to attach circuits and components to the enclosure are separately fabricated and attached to the chassis and front panel in positions required for the purpose, and often a variety of fittings must be employed to provide an intended mounting structure. By reason of the great number of fittings which must be normally assembled to house electronic circuitry of even average complexity, the cost in terms of labor and time to assemble circuit enclosures of conventional enclosures of conventional design is considerable. Furthermore, conventional cabinets, which are generally fabricated of sheet metal bent and stamped to the desired configuration, are also costly to manufacture since a multiplicity of sheet metal members must usually be welded and formed together to provide an enclosure of suitable strength and format. And if an attractive cabinet is to be provided by conventional means, additional and costly fabrication steps are needed to produce contouring and other styling details. A particular disadvantage of conventional cabinets is the difficulty of forming strong and yet attractive corners. As a further disadvantage, cabinets of different sizes must each be separately fabricated.

SUMMARY OF THE INVENTION

In accordance with the present invention, a relatively low cost rugged housing is provided in which many of the necessary fittings to which usual circuit mounting hardware can be attached, are formed as parts of the housing itself. The housing is formed of two extruded metal members which can be cut to any desired size and which mate to form a five-sided enclosure, including a bottom panel, front panel, top and sides. One extruded member is generally of L-shaped configuration and forms the front panel and bottom panel of the housing. The bottom panel includes a plurality of grooves formed in a parallel array on the upper surface thereof parallel to the front panel, these grooves being configured to accommodate respective circuit boards which are mounted therein, in a manner to be explained hereinbelow. The lower surface of the bottom panel can contain first and second flanges formed near the respective front and back edges of the panel to provide for the convenient attachement of rubber or plastic mounting feet for the enclosure.

The front panel of this extruded member includes first and second projections formed along the top and bottom edges thereof. These projections may have faces inclined at a suitable angle to accommodate written data thereon in an easily visible orientation, and can also act as stops, when like housings are stacked one upon the other, to prevent an upper housing from falling off a lower one on which it is disposed. The rearward portion of the projection formed along the top edge of the front panel contains an elongated channel to accommodate the cover member, as will be further explained hereinbelow. The upper edge of the front panel can also contain a rearwardly facing groove configured to accommodate circuit mounting hardware. A second hardware mounting groove can be formed in a flange upstanding along the rear edge of the bottom panel.

The extruded cover member is of generally U-shaped configuration and includes, on the inner surface of the top plate thereof, a plurality of ridges formed in parallel array in a direction parallel to the downwardly extending side panels of the cover member. These projections provide air channels between the circuit boards when the enclosure is in its closed position.

Individual circuit boards are mounted in respective grooves formed on the inner surface of the bottom panel and are secured in their upstanding position by spacer rods connected between the mounting grooves on the front panel and the respective boards. Control knobs, switches, meters, lights and other elements are mounted on the front panel to suit the particular situation. A back panel can be mounted on the rear of the housing and secured thereto by fasteners connected to the rear flange formed on the back edge of the bottom panel. The cover member is secured to the bottom member by inserting the front edge portion of the top panel into the channel provided in the rear of the upper front panel projection and fitting the sides into engagement with, and fastening them to, the side edges of the bottom member.

In the closed position of the housing, the ridges formed in the interior surface of the cover plate rest on the circuit boards mounted within the enclosure thereby forming air passages between the cover member and the circuit boards which allow the flow of air for the cooling of circuitry contained therein. The cover member can be made longer than the associated bottom member so that the cover extends rearwardly beyond the back panel of the enclosure, thereby to protect components which may be mounted on this back panel. The enclosure is typically formed of extruded aluminum and is extremely rugged and yet attractive in appearance.

As a feature of the invention, the extruded member forming the front panel and bottom panel of the enclosure contains a number of fittings which are particularly effective to mount circuitry within the enclosure, as well as to secure the cover member. These fittings are preformed as part of the extrusion; thus, the costly assembly of hardware, as required with conventional enclosures, is markedly reduced since the amount of ancillary hardware needed to fabricate and assemble the enclosure is minimized. The cover member is positively fitted to the front panel by means of the channel provided along the top edge thereof, and only a few screws or other fasteners are required to fully secure the sides of the cover member to the bottom panel. The extruded cabinet members according to the invention, are formed with clean stylistic detail so that an assembled cabinet has attractive corners and an overall quality appearance.

Description of the drawings

The invention will be more fully understood from the following detailed description taken in conjunction with the accompanying drawings in which.

Detailed description of the invention

Figures 1, 3, 4:
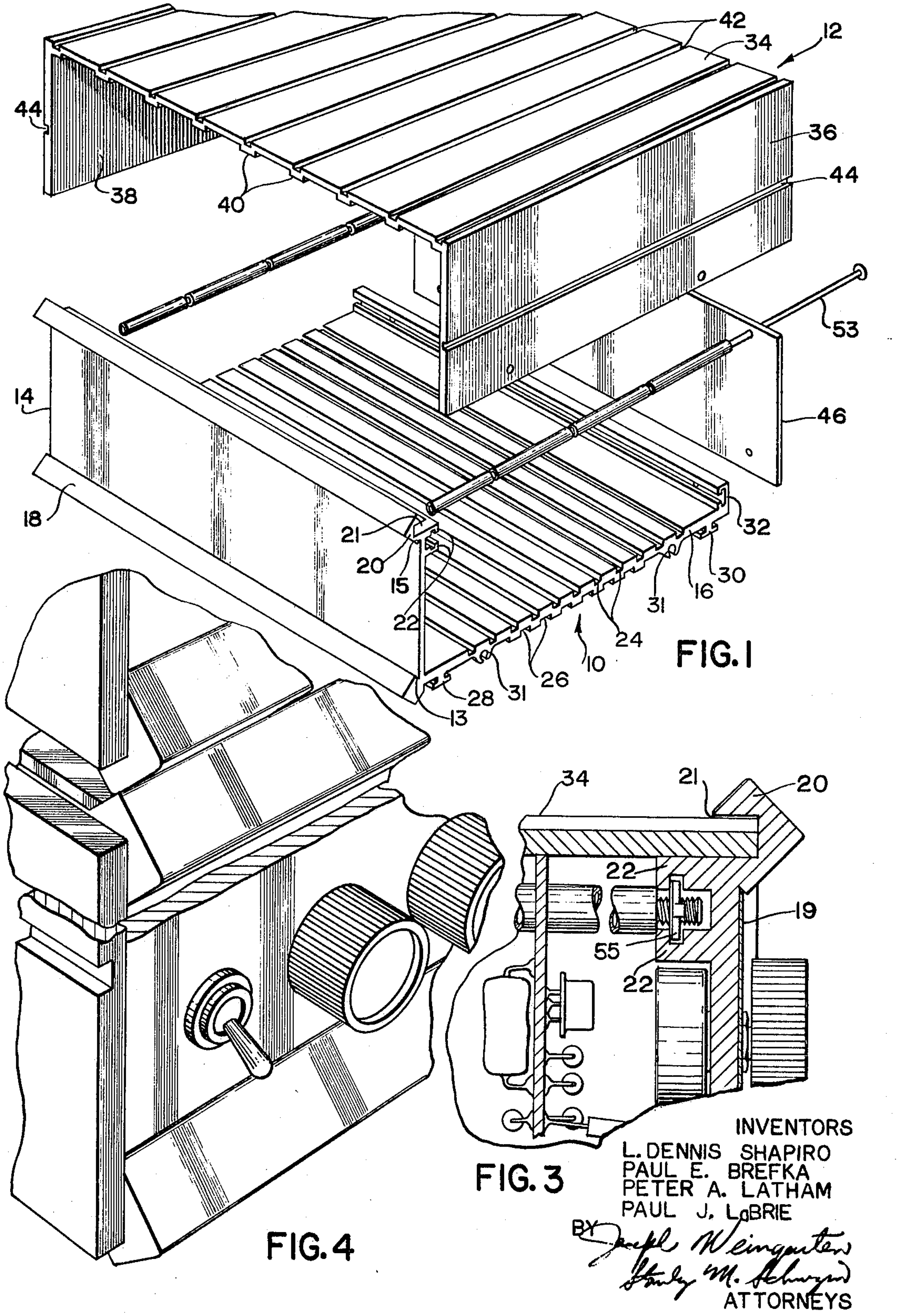
FIG. 1 is an exploded pictorial view of an extruded enclosure according to the invention.
FIG. 3 is a broken away sectional elevation view illustrating the assembly of the extruded members.
FIG. 4 is a broken away pictorial view illustrating the mounting of like enclosures one upon the other.

Referring to FIG. 1 there are shown the major constituents of an enclosure according to the invention. A first extruded unitary member 10 forms the front panel and bottom panel of the housing, while a second extruded unitary member 12 forms the top and sides of the housing. Member 10 is formed of extruded aluminum and includes a front panel 14 disposed perpendicularly to and upstanding from a base member 16. A pair of faceted projections 18 and 20 are formed on the front panel, projection 18 being formed along the bottom edge thereof at the intersection of front panel 14 and bottom panel 16, and the projection 20 being formed along the top edge of the front panel. Each projection appears as a portion of a rectangular bar. Upper projection 20 has formed rearwardly therein a rectangular channel 21 formed along the full width of the front panel, this channel being dimensioned to receive the top front edge portion of the cover member when the enclosure is assembled. Also formed near the top rear edge of front panel 14 are a pair of spaced apart parallel flanges 22, defining a groove therebetween operative to hold mounting hardware, as will be further explained hereinbelow. The top surface of the upper flange 22 is common to the lower surface of the channel 21 formed in projection 20, this common surface being employed to support the cover member. The juncture of projection 18 and front panel 14 is formed with an undercut to provide a generally V-shaped groove 13 along the lower portion of the front panel. The juncture of projection 20 and front panel 14 is similarly undercut to provide another generally V-shaped groove 15 along the upper portion of the front panel. These grooves are employed, according to the invention, to retain a thin sheet 19 of plastic or other suitable material which may contain panel markings for the control knobs and switches. An edge of this thin sheet is visible in FIGS. 2, 3 and 5. The sheet may be of transparent or opaque material, as desired. Of course, panel markings can also be provided directly on the front panel, and an unmarked transparent sheet can be employed to protect the panel from dirt and scratching.

The bottom panel 16 has a plurality of grooves 24 formed in the upper surface thereof and regularly spaced in a direction parallel to front panel 14. The bottom surface of the bottom panel also has a plurality of wider grooves 26 formed in a parallel array therein. First and second inverted T-shaped members 28 and 30 are formed on the lower surface of bottom panel 16 and depend therefrom, respectively, near the front and back edges of the bottom member. An upstanding flange 32 is formed along the rear edge of base member 16 and has a T-shaped channel formed therein and facing front panel 14, this channel also being configured to attach mounting hardware thereto. A pair of openings 31 are provided on each lateral edge of bottom panel 16 by means of curved extrusions, as shown. These openings are employed to secure the cover member to the bottom panel by self-tapping screws which pass through holes provided in the sides of the cover member and which mate with openings 31. As an alternative construction, bottom panel 16 can be formed with land portions 33, as illustrated in FIG. 2, which can be tapped or drilled to provide holes 35 for securing the cover member to the bottom panel.

Cover member 12, which is also formed of extruded aluminum, includes a top panel 34 and parallel sides 36 and 38 depending from respective opposite edges thereof. The inner surface of top member 34 has a plurality of ridges 40 formed thereon in regularly spaced array parallel to the side walls 36 and 38. A plurality of grooves 42 are formed in the upper surface of cover plate 34, each groove being formed in alignment with a respective ridge 40 on the lower surface thereof. Similar grooves 44 are formed in each side wall 36 and 38. These latter grooves 42 and 44 are mainly for decorative purposes although they function to reduce the amount of metal within the cabinet. The thickness of the top member 34 between its upper surface and the lowermost surface of ridges 40 is dimensioned to tightly fit within channel 21 provided within projection 20.

Extruded members 10 and 12 can be fitted together by aligning member 12 rearward of member 10 and then sliding member 12 forward to fit the front edge of the cover into channel 21 in projection 20. Alternatively, the front edge of the cover can be rested on the lower surface of channel 21 and the cover then urged into place by downward and forward pressure. A back panel 46 can be attached to flange 32 by a suitable fastener to complete the enclosure.

Figure 2:
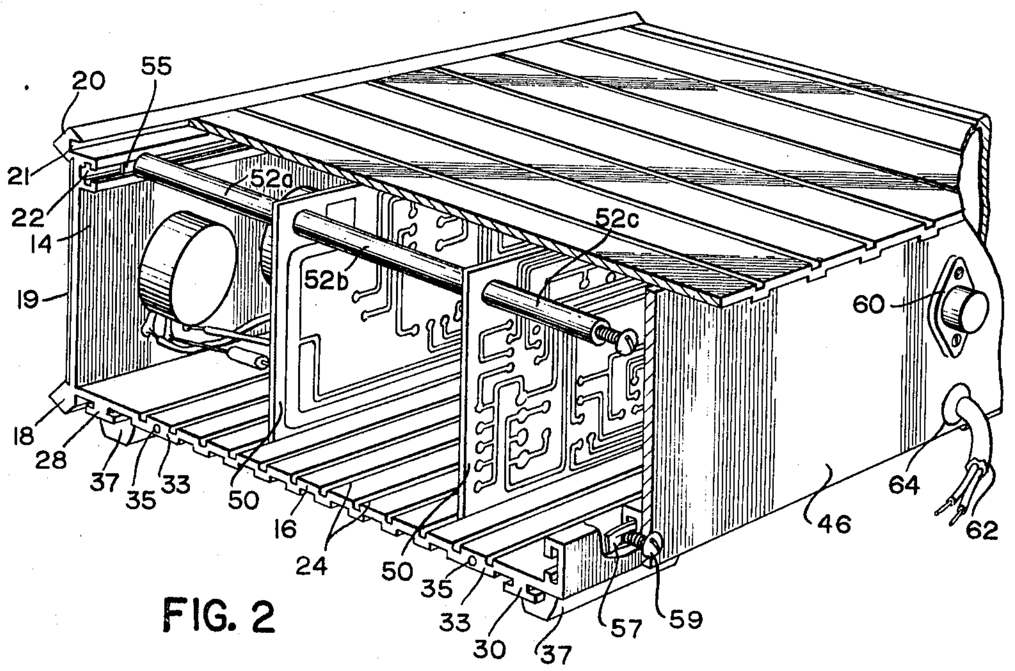
FIGURE 2 is a broken away pictorial view of an assembled enclosure illustrating the circuitry mounted therein.

FIG. 2 shows the assembled housing according to the invention with typical circuitry mounted therein. Circuit boards 50 are mounted within respective grooves 24 and are secured in their upstanding position by spacer bars 52 which extend between the front panel 14 and back panel 46. More particularly, a spacer bar **52*a* is attached between the front-most circuit board 50 and flange 22 provided in front panel 14, spacer 52*b* is attached between the respective circuit boards 50, and spacer 52*c* is attached between rear-most board 50 and back panel 46. The spacers are secured in position by an elongated threaded rod 53 (FIG. 1) passing through the spacers and the circuit boards. The head of rod 53 passes through a hole provided in rear panel 46, and is secured to a nut 55 held within the groove formed in flange 22. Rear panel 46 is attached to bottom panel 16 by means of a nut 57 held within the channel formed in flange 32, with a machine screw 59 connected thereto through a hole provided in panel 46**.

A more detailed view of the attachment of mounting hardware to the housing flanges is shown in FIG. 3. A portion of the cover panel 34 is shown inserted within channel 21 formed in projection 20. A nut 55 is shown captured within the vertical portion of the groove defined by flanges 22, and this nut is threadably secured to the threaded end of rod 53. The ridges 40 formed in the lower surface of the cover member rest on the top edges of circuit boards 50 to define air passages over these boards which allow the circulation of air within the enclosure for cooling purposes. Ridges 40 similarly rest on the top edge of rear panel 46 to allow air to enter the enclosure via the channels thereby defined. The inverted T-shaped projections 28 and 30 formed on the lower surface of bottom panel 16 are provided for the easy mounting of resilient footings 37. These footings, which are typically made of rubber or plastic, are configured to slide onto the T-shaped projections to provide a resilient mounting foot for each corner of the enclosure.

As illustrated in FIG. 2, a power transistor 60 is attached to back panel 46, which provides an efficient thermal mount for the transistor, and a power cord 62 is also secured to this panel by a cord clamp 64. The cover member 12 is longer in depth than the bottom panel 16; thus, the cover extends rearwardly beyond back panel 46 to provide an overhang which encloses the elements secured to this back panel and offers protection of such elements from possible physical damage. The overhanging rear portion also serves an esthetic purpose, as it shields from view, elements mounted on the back of the enclosure which could mar the clean lines of the enclosure.

Enclosures constructed according to the invention are easily nested one upon the other, as illustrated in FIG. 4. The mounting feet of an upper enclosure rest on the top surface of the cover member of a like lower enclosure. A surface of lower faceted projection 18 on the upper enclosure butts against a surface of upper faceted projection 20 of the lower enclosure thereby serving as a stop to prevent the upper enclosure from inadvertent falling.

It is a major feature of the invention that the housing is formed of extruded members and that only two such members are necessary to form the enclosure. Each extruded member is formed in a continuous extrusion which is cut at convenient lengths for ease of handling. The elongated extrusions can then be cut at predetermined intervals to form the individual enclosure components. By use of such novel extrusions, housings of different sizes can be provided merely by cutting one extrusion at a selected length and then matching the other extrusion to the selected size. For example, member 10 can be cut to any length to provide a front panel and bottom panel of a predetermined size. Member 12 can then be formed in a size accommodatable to member 10.

Figure 5:
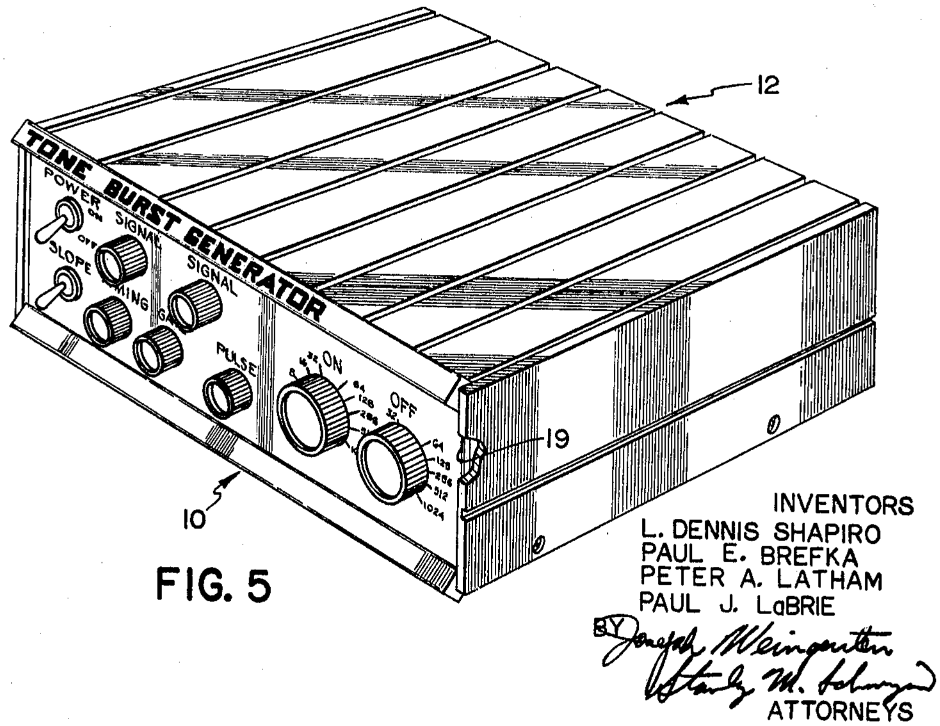
FIG. 5 is a perspective view of an assembled enclosure according to the invention.

The assembled housing is shown in FIG. 5 with typical control knobs and switches on the front panel. The panel markings are made on the front panel, with a transparent sheet 19 retained over the front panel in grooves 13 and 15 to protect the panel. As discussed hereinabove, the cover member 12 is fitted to member 10, with the front edge portion of top panel 34 in close engagement with channel 21 formed in faceted projection 20, and the bottom edge portions of sides 36 and 38 in engagement with the edges of bottom panel 16. Sides 36 and 38 have holes provided near the bottom edges thereof through which suitable fasteners are inserted for mating with the holes in bottom panel 16, which may be of the extruded type shown in FIG. 1 or drilled type of FIG. 2. The channel 21 extends beyond the plane of front panel 14, and the assembled cover member fits fully into this channel so that the front edges of sides 36 and 38 extend beyond the plane of front panel 14, these front edges being disposed approximately midway of the width of projections 18 and 20. Thus, in the assembled position, the front edges of sides 36 and 38 cover the side edges of front panel 14 and extend slightly beyond the front panel to provide a distinctive and attractive corner and edge structure.

In the assembled position, the sides 36 and 38 fully cover the edges of bottom panel 16 and are securely attached thereto by screws or other suitable fasteners. Such side fastening, together with the positive engagement of cover 12 in channel 21, prevents relative motion between housing members 10 and 12 and affords an extremely rugged cabinet structure.

Various modifications and alternative implementations of the invention will now occur to those versed in the art. For example, the front panel projections need not be faceted as in the illustrated embodiment, but can be of other suitable shapes. In addition, it will be appreciated that the novel housing can also be employed to package components and equipment other than electronic circuitry. Accordingly, it is not intended to limit the invention by what has been particularly shown and described, except as indicated in the appended claims.

What is claimed is:

1. A housing comprising:

a first extruded unitary member forming the front panel and bottom panel of said housing, said member including a rectangular bottom panel having a plurality of parallel grooves formed in the inner surface thereof;

a front panel formed at an angle to and upstanding from said bottom panel and disposed along an edge thereof parallel to said grooves;

first and second projections formed respectively along the top and bottom edges of said front panel and each extending outwardly therefrom, said first projection being formed at the intersection of said front panel and said bottom panel;

said second projection having a rectangular channel formed therein and facing rearwardly of said enclosure; and a second extruded unitary member forming the top and sides of said housing, said second member including a rectangular top panel and first and second side panels each depending orthogonally from a respective opposite edge of said top panel;

the thickness of said top panel being dimensioned to positively engage the channel formed in said second projection;

said first and second unitary members being dimensioned to engage one another to form a rigid enclosure.

2. A housing according to claim 1 further including first and second grooves undercut into the respective junctures of said front panel and said first and second projections and operative to retain a thin sheet therebetween adjacent said front panel.

3. A housing according to claim 1 further including a plurality of grooves formed in the upper surface of said top panel disposed parallel to said side panels.

4. A housing according to claim 1 in which said top panel has a depth dimension longer than the depth dimension of said bottom panel thereby to provide an overhang of the rear portion of said second member.

5. A housing according to claim 1 further including first and second members formed on the outer surface of said bottom panel near the respective front and back edges thereof and adapted to secure mounting feet attached thereto.

6. A housing according to claim 1 further including first and second spaced-apart flanges formed near the top edge of said front panel and defining a groove therebetween parallel to said top edge and adapted to retain fastening means disposed therein.

7. A housing according to claim 1 further including a flange formed along the rear edge of said bottom panel and extending upward therefrom, said flange having a groove formed therein facing said front panel and adapted to retain fastening means disposed therein.

8. A housing according to claim 1 further including a plurality of ridges formed on the inner surface of said top panel and disposed parallel with said side panels.

9. A housing according to claim 1 further including first and second members formed on the outer surface of said bottom panel near the respective front and back edges thereof and adapted to secure mounting feet thereto;

first and second spaced-apart flanges formed near the top edge of said front panel and defining a groove therebetween parallel to said top edge and adapted to retain fastening means disposed therein;

a flange formed along the rear edge of said bottom panel and extending upward therefrom, said flange having a groove formed therein facing said front panel and adapted to retain fastening means disposed therein; and a plurality of ridges formed on the inner surface of said top panel and disposed parallel with said side panels.

10. A housing according to claim 9 further including a back panel attached to the flange formed at the rear of said bottom panel by fastening means mating with the fastening means retained therein.

11. A housing according to claim 10 further including a plurality of circuit boards each disposed in a respective one of said parallel grooves and secured in a position upstanding from said bottom panel by spacer rods secured between said back panel and said spaced-apart flanges.

12. A housing comprising:

a first extruded unitary member forming the front and bottom of said housing, said member including a rectangular bottom panel and a front panel formed at an angle to and upstanding from one edge of said bottom panel;

a projection formed along the top edge of said bottom panel and a rectangular channel formed in said projection and facing rearwardly of said enclosure; and a second extruded unitary member forming the top and sides of said housing, said second member including a rectangular top panel and first and second side panels each depending orthogonally from a respective opposite edge of said top panel;

said first and second unitary members being dimensioned to engage one another to form a rigid enclosure, with one edge of said top panel being intimately engaged within said rectangular channel.

References Cited

UNITED STATES PATENTS 3,011,098 11/1961 Godley ............ 317—99 X

LEWIS H. MYERS, Primary Examiner

G. P. TOLIN, Assistant Examiner

U.S. Cl. X.R.

312—223; 317—101